United States Patent [19]

Shiraishi et al.

[11] Patent Number: 4,844,770

[45] Date of Patent: Jul. 4, 1989

[54] THERMAL-TRANSFER RECORDING APPARATUS

[75] Inventors: Mikio Shiraishi, Yokohama; Toshihiko Gotoh, Tokyo; Kentaro Hamma, Yokohama; Hiroyuki Kimura, Kanagawa; Yasunori Kobori, Yokohama; Koichi Tomatsuri, Katsuta, all of Japan

[73] Assignee: Hitachi, Ltd., Tokyo, Japan

[21] Appl. No.: 101,436

[22] Filed: Sep. 28, 1987

[30] Foreign Application Priority Data

Sep. 29, 1986 [JP] Japan ................................ 61-228367

[51] Int. Cl.[4] .......................... B44C 1/17; D06P 1/02; G01D 9/00; B41J 3/02

[52] U.S. Cl. .................................... 156/387; 156/241; 156/540; 8/471; 346/135.1; 400/120

[58] Field of Search ............... 156/240, 241, 247, 249, 156/540, 542, 541, 361, 364, 380.9, 499, 235; 400/120, 605, 642, 644; 101/211, 470; 8/471; 346/1.1, 135.1, 76 PH

[56] References Cited

U.S. PATENT DOCUMENTS

| | | | |
|---|---|---|---|
| 4,157,412 | 6/1979 | Deneau | 156/241 |
| 4,237,466 | 12/1980 | Scranton | 400/644 |
| 4,352,721 | 10/1982 | Park et al. | 8/471 |
| 4,568,951 | 2/1986 | Hasegawa et al. | 101/470 |
| 4,724,336 | 2/1988 | Ichikawa et al. | 400/120 |
| 4,738,553 | 4/1988 | Uemura et al. | 400/120 |
| 4,741,634 | 5/1988 | Nozaki et al. | 400/120 |

FOREIGN PATENT DOCUMENTS

| | | | |
|---|---|---|---|
| 169370 | 10/1982 | Japan . | |
| 147390 | 9/1983 | Japan . | |
| 04393 | 7/1987 | PCT Int'l Appl. | 156/240 |

*Primary Examiner*—Robert A. Dawson
*Assistant Examiner*—Louis Falasco
*Attorney, Agent, or Firm*—Antonelli, Terry & Wands

[57] ABSTRACT

A thermal-transfer recording method and an apparatus used for this method in which ink on an ink tape is heat-transferred in the form of a mirror image of a desired image to an intermediate recording sheet having a base film and an ink absorbing adhesive layer formed on the base film, and in which the intermediate recording sheet to which the mirror image has been heat-transferred is bonded to a desired recording medium at the surface of the ink absorbing adhesive layer.

11 Claims, 7 Drawing Sheets

THERMAL-TRANSFER RECORDING APPARATUS

BACKGROUND OF THE INVENTION

This invention relates to a method of and apparatus for performing thermal-transfer recording and, more particularly, to a thermal-transfer recording method capable of stably printing an image on any desired recording medium and to an apparatus used for this method.

Recently, as information systems have improved, there have been increased demands for the provision of various types of output as hard copies. A recording apparatus used to realize such hard copy outputs needs to have improved operability, maintainability, and reliability and also be smaller and quieter. To satisfy these requirements, heat-sensitive recording apparatuses are widely used in facsimile systems, copies, and similar devices. However, a thermal-transfer recording apparatus has a disadvantage in that it necessitates heat-sensitive recording paper which contains coloring substances within the paper itself, and therefore it is not capable of printing on other types of paper. In addition, it is not possible to realize any continuous tone color on heatsensitive recording paper and, hence, obtain the type of color image which is formed by superposing single-color images having continuous tone color.

A type of thermal-transfer recording apparatus which makes use of a sublimable ink tape formed by applying sublimable dyes to the surface of a base film has been known as an image recording system for obtaining single-color image prints and color image prints displaying continuous tone color. An example of this system is disclosed in Japanese Patent Laid-Open No. 169370/1982. In this thermal-transfer recording apparatus, a sublimable ink tape and recording paper having a support layer and an ink absorbing layer formed on the support layer are used; and the sublimable ink tape is heated by a thermal head so as to liberate the sublimable dyes from the base film and fix them to the absorbing layer of the recording paper, thereby obtaining an image print. This system enables single-color image prints and color image prints displaying continuous tone color, but it necessitates special recording paper having a layer into which sublimable inks are absorbed and therefore it cannot form image prints on any other desired recording medium such as letter paper, postcards, high-quality paper, and cloth. This system is also defective in that an image print formed in the above-described manner changes with the passage of time as the sublimable dyes fixed to the recording paper sublime therefrom.

A method of preventing this kind of change in an image print with the passage of time is disclosed in Japanese Patent Laid-Open No. 147390/1983. According to this method, a laminated film is heat-bonded to the surface of the recording paper after recording so as to prevent any re-sublimation of dyes from the absorbing layer of the recording paper. This method can prevent th image print from changing with the passage of time, but it is still incapable of forming image prints on any desired recording mediums.

SUMMARY OF THE INVENTION

It is an object of the present invention to provide a thermal-transfer recording method and an apparatus for the same which are free from the abovedescribed problems of the prior art and which are capable of stably printing images on any desired recording mediums.

To this end, the present invention provides a thermal-transfer recording method in which ink on an ink tape is heat-transferred in the form of a mirror image of a desired image to an intermediate recording sheet having a base film and an ink absorbing adhesive layer formed on the base film; and the intermediate recording sheet to which the mirror image has been heat-transferred is bonded to a desired recording medium at the surface of the ink absorbing adhesive layer.

Preferably, the intermediate recording sheet is bonded to the recording medium by heating.

The present invention provides a thermal-transfer recording apparatus having an intermediate recording sheet processing device and a bonding device, wherein the intermediate sheet processing device has: an ink tape to which ink of at least one color has been applied; an intermediate recording sheet having a base film and an ink absorbing adhesive layer formed on the base film; a cassette containing the intermediate recording sheet; a guide drum for guiding the intermediate recording sheet; supply means for supplying the intermediate recording sheet to the guide drum; a thermal head having a plurality of heating points, the thermal head being adapted for transferring a mirror image of a desired image to the intermediated recording sheet by selectively heating the ink tape so as to transfer the ink to the ink absorbing adhesive layer of the intermediate recording sheet; an ink tape supply device for introducing the ink tape into the gap between the thermal head and the intermediate recording sheet on the guide drum; a discharge member for separating the intermediate recording sheet to which the mirror image has been transferred from the guide drum; and a control unit for converting an image signal into a mirror image signal and selectively making the plurality of heating points of the thermal head generate heat on the basis of the converted mirror image signals while controlling the amount of heat generated at the heating points, and the control unit controlling the operations of the intermediate recording sheet supply means, the ink tape supply device and the discharge member; and wherein the bonding device has a desired recording medium and a bonding means for bonding the intermediate recording sheet to which the mirror image has been transferred to the recording medium at the surface of the ink absorbing adhesive layer Preferably, the bonding device is accommodated in a box separate from the intermediate sheet processing device. In another aspect of the present invention, the bonding device and the intermediate recording sheet processing device are accommodated in one box.

It is preferable for the base film of the intermediate recording sheet is formed on a transparent member.

DETAILED DESCRIPTION OF THE PREFERRED EMBODIMENTS

Figure 1:
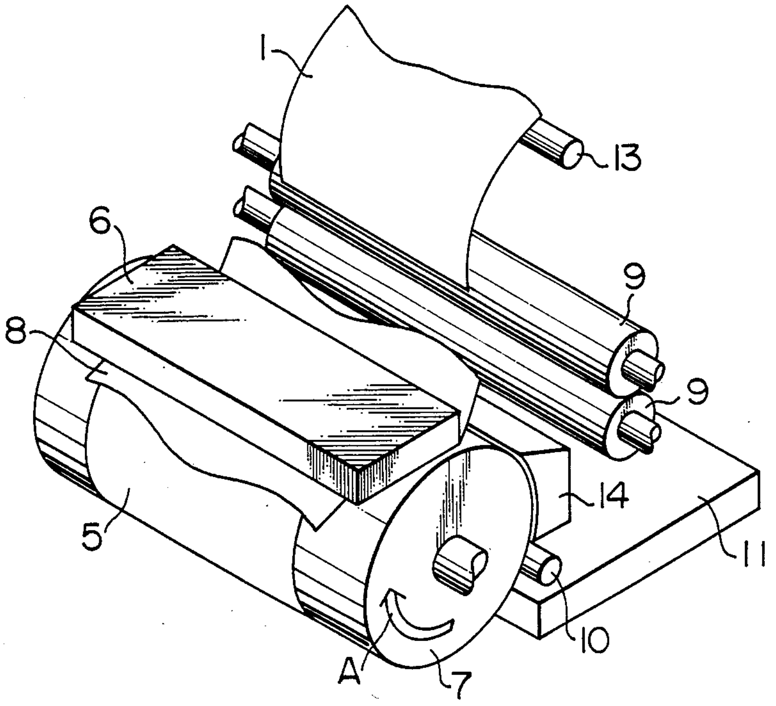
FIG. 1 is a schematic perspective illustration of essential part of the internal structure of a thermal-transfer recording apparatus which represents a first embodiment of the present invention.
Figure 5:
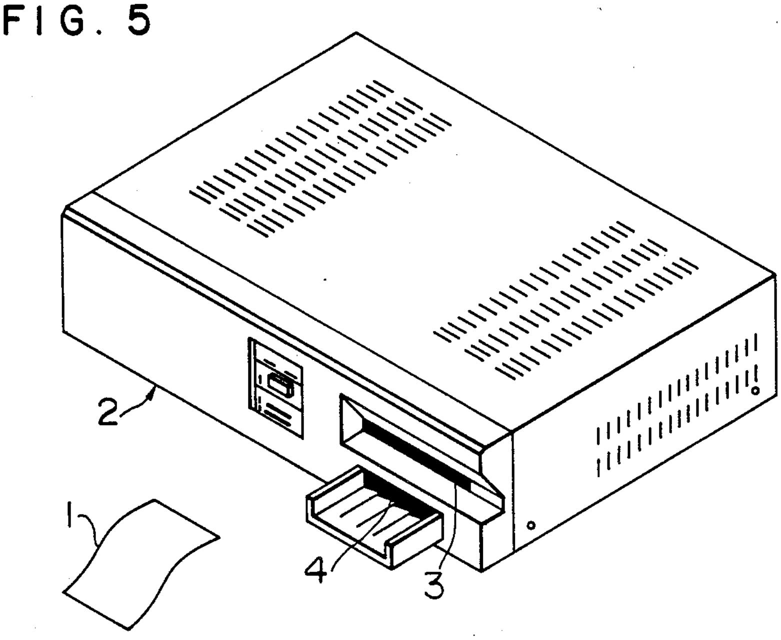
FIG. 5 is a perspective view of the appearance of the first embodiment.

A first embodiment of the present invention will be described below with reference to FIGS. 1 to 5.

In this embodiment, a thermal-transfer recording apparatus is constructed by accommodating an intermediate sheet processing device and a bonding device in one box. A tape 8, to which ink 17 which contains a sublimable dye has been applied, extends between an ink tape supply reel 15 and an ink tape winding reel 16. A thermal head 6, which has a plurality of heating points 20, is disposed so as to face the surface of the tape 8 that is opposite to the surface to which the ink 17 containing the sublimable dye has been applied. A guide drum 7 is rotatably disposed on the side of the surface of the tape 8 to which the ink 17 has been applied so as to face the thermal head 6. A cassette 11 which contains intermediate recording sheets 5 is disposed in the vicinity of the guide drum 7. A supply roller 10, guide rollers 10*a* and 10*b*, and a guide plate 10*c*, which are adapted to supply and guide each of the intermediate recording sheets 5 from the cassette 11 onto the guide drum 7, are disposed around the guide drum 7. Each of the intermediate recording sheets 5 is thereby supplied so as to be transported between the ink tape 8 and the guide drum 7.

Each intermediate sheet 5 has a base film 19 and a layer 18 which is formed on the base film and which serves as a sublimable dye ink absorbing layer as well as a bonding layer. It is necessary that the base film 19 is formed from a material that has a glass transition temperature (for example, 300° C.) higher than a set temperature (250° C.) of the bonding device, which will be described later. In this embodiment, a synthetic material in the polyethylene terephthalate group is used to form this film. It is preferable that the sublimable dye ink absorbing adhesive layer 18 is formed from a material which has a strong chemical affinity with the sublimable dye ink and which has a glass transition temperature (for example, 200° C.) higher than the temperature (for example, 120° C.) at which the sublimable ink starts to sublime. In this embodiment, it is polyester.

Figure 2:
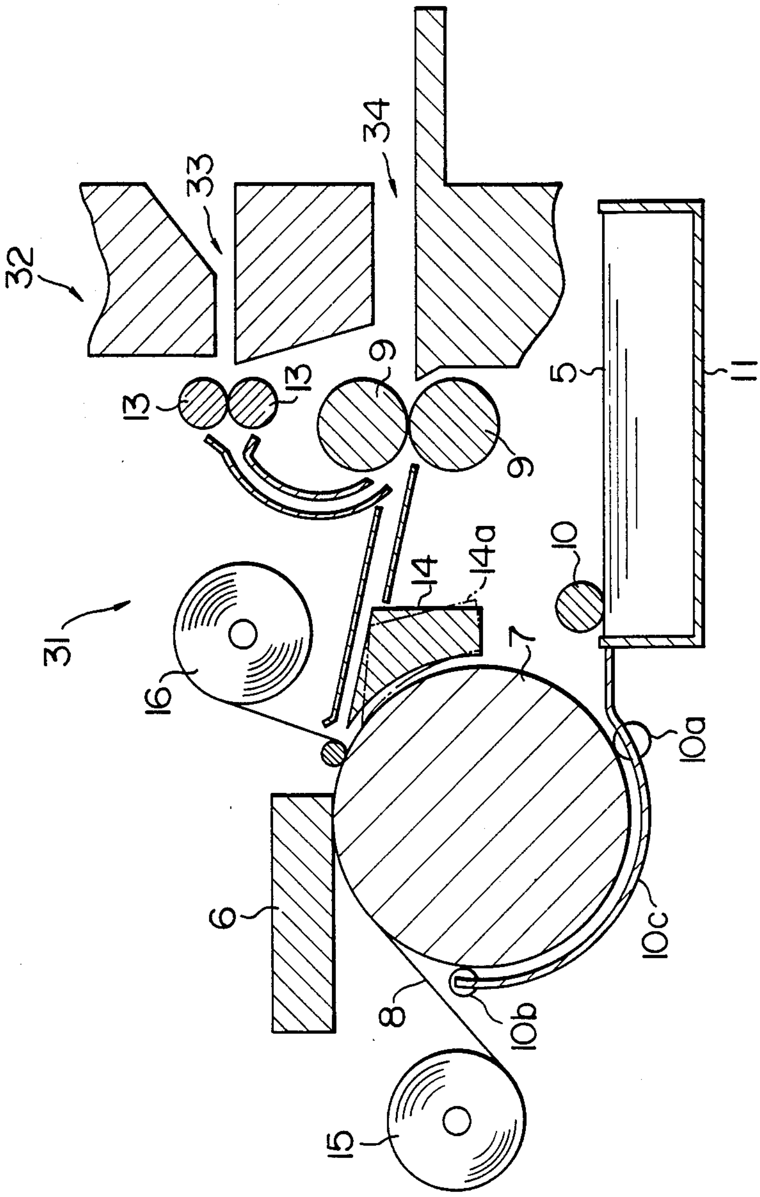
FIG. 2 is a schematic cross-sectional view of the first embodiment.

A discharge member 14 is disposed in the vicinity of the guide drum 7 at an intermediate sheet outlet of a thermal-transfer section formed by the thermal head 6 and the guide drum 7, and is mounted so as to be able to move to a position 14*a* indicated by the dot-dashed line in FIG. 2. The discharge member 14 has a function of separating from the guide drum the intermediate sheet 5 to which the sublimable dye ink 17 has been transferred from the ink tape 8.

A control unit 30 is provided to control the selective supply of electricity and the time during which the electricity is supplied to the plurality of heating points 20 that are arranged in a row on the thermal head 6, in other words, to control the generation of heat and the amount of heat generated. The construction of the control unit 30 will now be described with reference to FIG. 4. The control unit 30 has an image input section 21 for reading an image by breaking it down into digital image signals at a plurality of points, an image memory section 22 in which the plurality of digital image signals read by the image input section 21 is stored, main- and sub-scanning-direction memory address control sections 23 and 24 which operate so that the plurality of digital image signals are stored in the image memory 22 at predetermined addresses, read-out reversal switches 28 which set the order of the sub-scanning-direction addresses to be the reverse of the order used during writing when each of the digital image signals stored in the image memory section 22 is read out, and a print control section 25 which reads the digital image signals stored in the image memory 22 and selectively causes the heating points 20 of the thermal head 6 to generate heat on the basis of these signals while controlling the amount of heat generated. The print control section 25 also controls mechanical portion 27 other than the thermal head 6, such as, the supply roller 10, the guide rollers 10*a* and 10*b*, the ink tape supply reel 15, the ink tape winding reel 16, and the discharge member 14. The number of addresses in the main-scanning direction in the image memory 22 corresponds to the number of heating points 20 of the thermal head 6.

The intermediate recording sheet processing device is constructed as described above.

A bonding device is disposed at the downstream side, that is, on the right-hand side of the discharge member 14 as viewed in FIG. 2. The bonding device has a pair of heat rollers 9 which are rotatably disposed, and a discharge opening 34 formed in the vicinity of the heat rollers 9. A recording medium insertion opening 33 into which the desired recording medium is introduced is formed above the discharge opening 34, and a pair of recording medium supply rollers 13 are disposed in the vicinity of the insertion opening 33. A sheet of the recording medium which has been supplied from the recording medium supply rollers 13 is superposed on the intermediate recording sheet 5 which has been separated from the guide drum 7, and the superposed sheets are sent to the heat rollers 9.

The operation of obtaining color image prints in accordance with the present invention will now be described.

The ink tape 8 is used to obtain color image prints which is formed of cyan ink, magenta ink and yellow ink of sublimable dyes which are arranged so that stripes of these inks have predetermined widths and are disposed in sequence in the direction in which the ink tape advances.

A desired image is broken down by the image input section 21 into a plurality of points which correspond to the heating points 20, and these points are changed into digital image signals. These digital image signals contain primary color signals and signals which represent the continuous tone color with respect to each of the primary colors. The digital image signals are stored in the image memory 22 at predetermined addresses designated by the memory address control sections 23 and 24.

One intermediate recording sheet 5 is supplied from the cassette 11 by the guide rollers 10*a* and 10*b* and the guide plate 10*c* so as to be wound around the guide drum 7 and transported in the direction indicated by arrow A. The ink absorbing adhesive layer 18 of the intermediate recording sheet 5 faces outward from the guide drum 7. That is, the ink absorbing adhesive layer 18 faces the inked surface of the ink tape 8. The thermal head 6 presses the intermediate recording sheet 5 against the guide drum 7 with the ink tape 8 pinched between the head and the drum.

In response to a command from the print control section 25, the read-out reversal switches 28 are reversed, so that the digital image signals stored in the image memory 22 are read out in such a manner that the addresses of the digital image signals in the subscanning-direction are reversed in relation to the addresses used in writing. In accordance with the digital image signals thereby read out, the print control section 25 selectively supplies electricity to the heating points 20 of the thermal head 6 and, at the same time, it controls the time during which the electricity is supplied, according to the continuous tone color signals contained in the digital image signals. The cyan ink of the ink tape 8 is transferred to the ink absorbing adhesive layer of the intermediate recording sheet 5 with depth of color. After the transfer with respect to the address of one row is completed, the transfer for the next addresses is started, and the corresponding cyan ink is transferred to the ink absorbing adhesive layer 18 in the same manner. The mirror image of a desired image is thus transferred in cyan ink to the ink absorbing adhesive layer of the intermediate recording sheet 5. This is because the subscanning-direction addresses of the digital image signals are set in reverse, as mentioned above.

When the transfer of the mirror image in cyan ink is completed, the used portion of the ink tape 8 is wound up by the winding reel 16*a* so that a magenta ink portion is supplied to the thermal-transfer section formed by the thermal head 6 and the guide drum 7. The discharge member 14 is in the position indicated by the solid line in FIG. 2, so that the intermediate recording sheet 5 moves together with the guide drum 7 to reach the thermal-transfer section again.

The thermal transfer of magenta ink is performed in the same manner as described above. After the transfer of magenta ink has been completed, the thermal transfer of yellow ink is performed. This thermal transfer of yellow ink is performed in the same manner as that for the cyan and magenta inks. As a result, a mirror image of the desired image is transferred to the ink absorbing adhesive layer 18 of the intermediate recording sheet 5. When the transfer of the yellow ink is performed, the discharge member 14 is in the position 14*a* indicated by the dot-dashed line in FIG. 2, so that the intermediate recording sheet 5 on which a mirror image has been transferred is transported to the bonding device 32.

A sheet of a desired recording medium 1, which has been inserted into the recording medium insertion opening 33 is transported to the heat rollers 9 by the recording medium supply rollers 13, is superposed on the ink absorbing adhesive layer 18 of the intermediate recording sheet transported from the intermediate recording sheet processing device 31, and the superposed sheets are inserted into the nip between the pair of heat rollers 9. The heat rollers 9 are heated by heating means (not shown), such as heating wires, to a temperature set between the glass transition temperature (200° C.) of the ink absorbing adhesive layer 18 of the intermediate recording sheet 5 and the glass transition temperature (300° C.) of the base film 19 of the intermediate recording sheet 5. In this embodiment, the temperature to which the heat rollers are heated is set to about 250° C. The intermediate recording sheet 5 and recording medium 1 transported between the heat rollers 9 are heated in such a manner that only the ink absorbing adhesive layer is softened, so that it permeates through the fibers of the recording medium 1 and is bonded thereto. The sublimable dye inks which have been transferred to the ink absorbing adhesive layer 18 disperse to some extent in the softened ink absorbing adhesive layer 18, but they do not scatter outside the ink absorbing adhesive layer because the sublimable dye inks have a strong chemical affinity with the ink absorbing adhesive layer 18.

The bonded intermediate recording sheet 5 and recording medium 1 are removed through the discharge opening 34 after passing through the nip between the heat rollers 9. They are thereafter cooled until the ink absorbing adhesive layer 18, which has permeated through the surface of the recording medium 1 and has bonded to that medium, exhibits an adhesive force relative to the recording medium 1 that is greater than that relative to the base film 19, thereby enabling the base film 19 alone to be easily peeled off by an external means. A color image print of the desired image is thereby obtained on the surface of the recording medium 1.

To obtain a single-color image print, an ink tape 8 containing sublimable dye ink of a single color is used. In this case, the discharge member 14 is fixed at the position 14*a* indicated by the dot-dashed line in FIG. 2, so that an intermediate recording sheet 5 to which the ink has been transferred is directly transported to the bonding device 32.

In the above-described embodiment, a mirror image of the desired image is first formed on the surface of the intermediate recording sheet 5, then the adhesive surface to which the ink has been transferred is bonded to the surface of the recording medium 1, thereby effecting recording. It is therefore possible to record any desired image by forming the image print on a desired recording medium which has no ink absorbing layer.

No ink is exposed on the surface of the recording medium after the recording has been completed, so the method in accordance with the present invention is advantageous in terms of the life of the image print.

It is also possible to use, for the recording medium, a material such as a cloth which has substantially no rigidity, by forming the heat rollers 9 of the bonding device with a soft material such as sponge or rubber, or making the distance between the rollers variable.

This embodiment is also advantageous in that the thermal transfer recording apparatus can be made smaller since the intermediate recording sheet processing device 31 and the bonding device 32 are accommodated in the same box.

In this embodiment, sublimable dyes are used to prepare the inks, but other coloring materials applicable to thermal-transfer recording, such as, heat-fusible pigments, may be used instead.

In this embodiment, the process of recording the mirror image of the desired image onto the intermediate recording sheet 5 is conducted by changing the subscanning direction address setting of the memory. However, the recording can readily be performed by, for example, a method of changing the setting of the main-scanning direction addresses of the memory, a method of reversing the order of alignment of the heating points of the thermal head 6, a method of reversing the supply of the sheet at a mechanical portion 27 so as to make the recording in the sub-scanning direction reverse to that on input, or a method of inputting a mirror image of the desired image in the image input section 21.

In this embodiment, the intermediate recording sheet 5 and the recording medium 1 ar heat-bonded to each other by using the heat rollers 9, but other means, such as ultraviolet rays or ultrasonics, may be used to effect the bonding. However, bonding by heat ensures the highest energy efficiency.

Other embodiments of the present invention will be described below.

Figure 6:
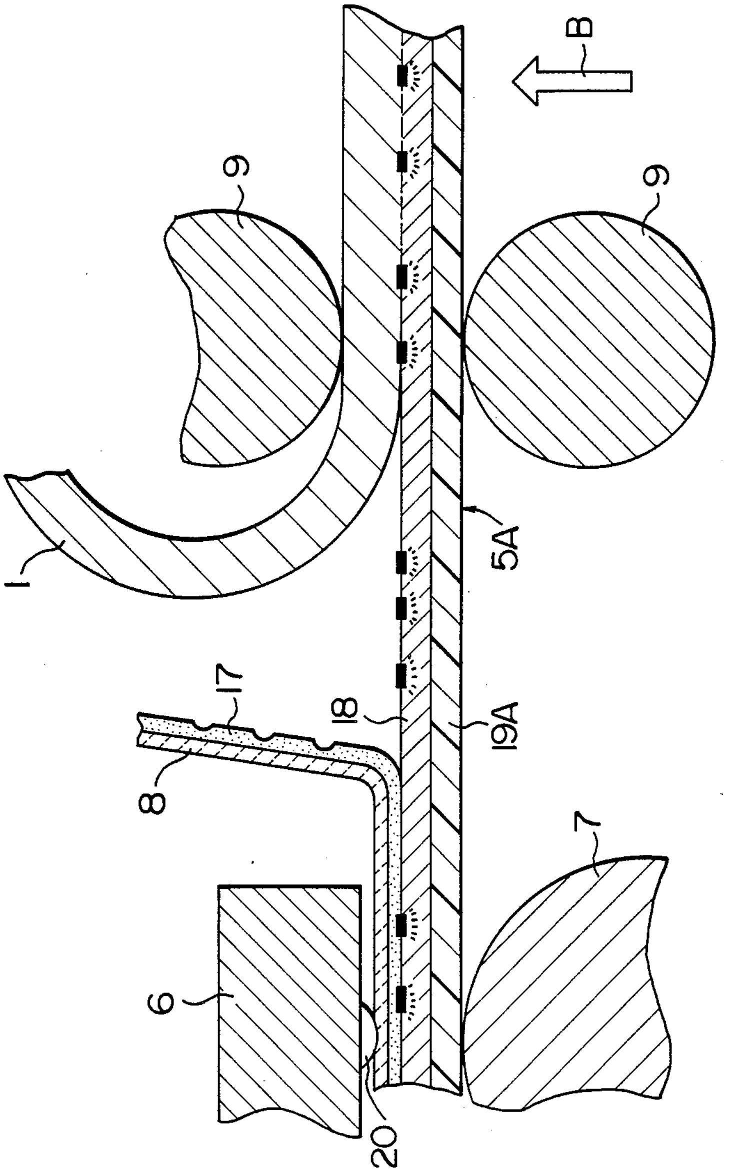
FIG. 6 is a cross sectional view of essential part of a thermal-transfer recording apparatus of a second embodiment of the present invention, during the process transferring ink to an intermediate recording sheet and bonding the intermediate recording sheet to a recording medium.

FIG. 6 shows a cross-sectional view of details of a thermal-transfer recording apparatus of a second embodiment of the present invention when effecting recording on an intermediate recording sheet and bonding to a recording medium.

Figure 3:
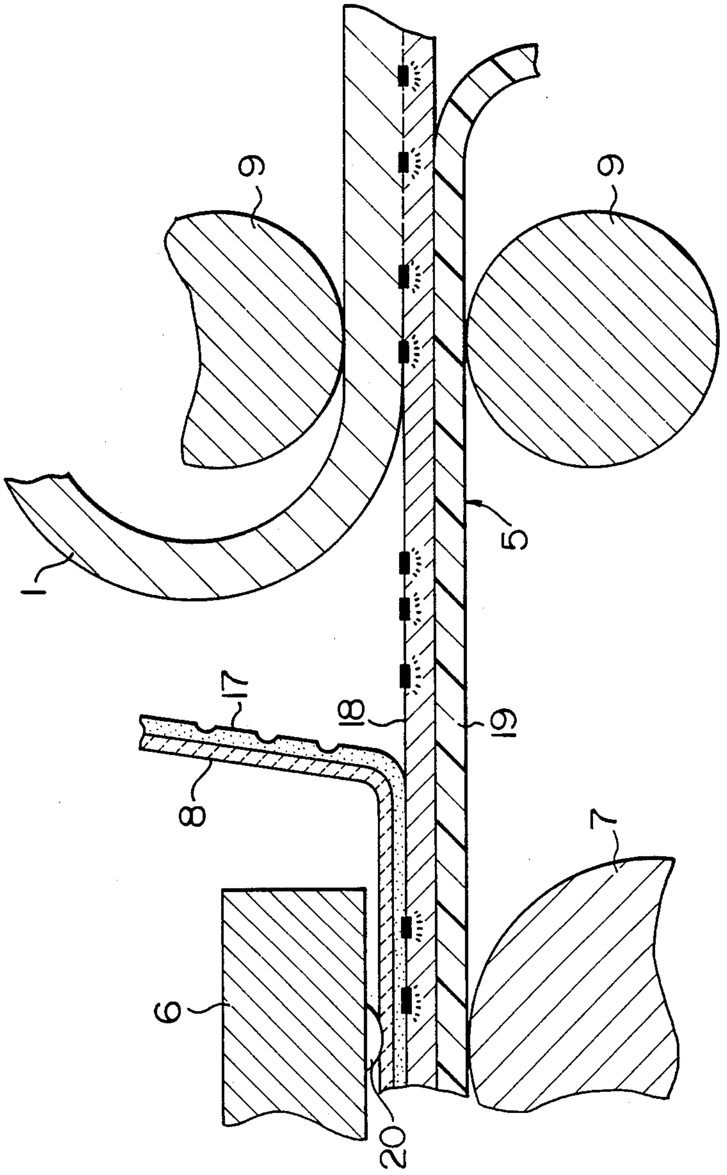
FIG. 3 is a schematic cross-sectional view of the first embodiment during the process of transferring ink to an intermediate recording sheet and bonding the intermediate recording sheet to a recording medium.
Figure 4:
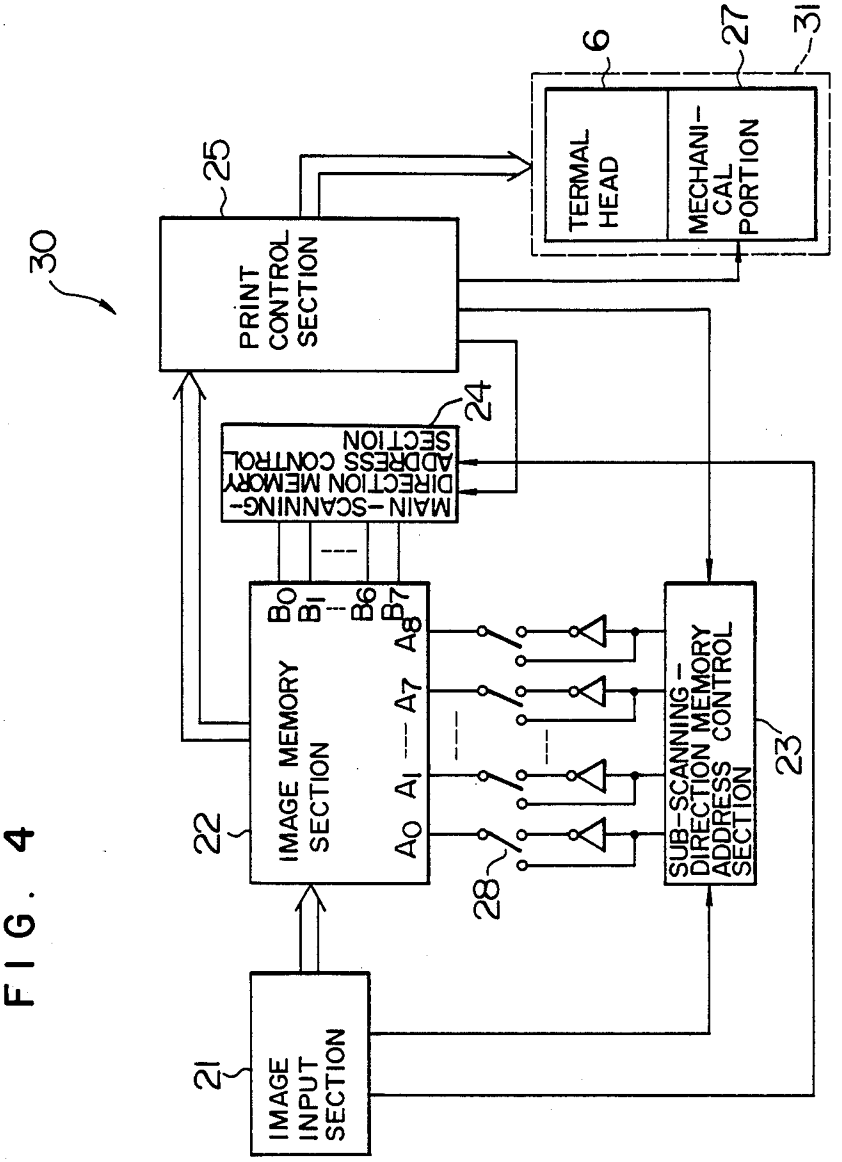
FIG. 4 is a block diagram of the control unit of the first embodiment.

In FIG. 6, the same components as those in FIG. 3 are indicated by the same reference numerals. An intermediate recording sheet 5A is constituted by a base film 19A formed of a transparent member, and an ink absorbing layer 18 formed on the base film 19A.

The process of recording the mirror image of a desired image onto the intermediate recording sheet 5A and the process of bonding the intermediate recording sheet thereby recorded to recording medium 1 are performed in the same manner as in the above-described embodiment. After the bonding, the desired image is obtained, which can be seen through the base film 19A from the side of the base surface, that is, in the direction indicated by arrow B in FIG. 6 since the base film 19A of the intermediate recording sheet 5A is transparent.

This embodiment has an advantage in that there is no need to peel off the base film 19A, in addition to the advantages of the embodiment shown in FIG. 1.

Figure 7:
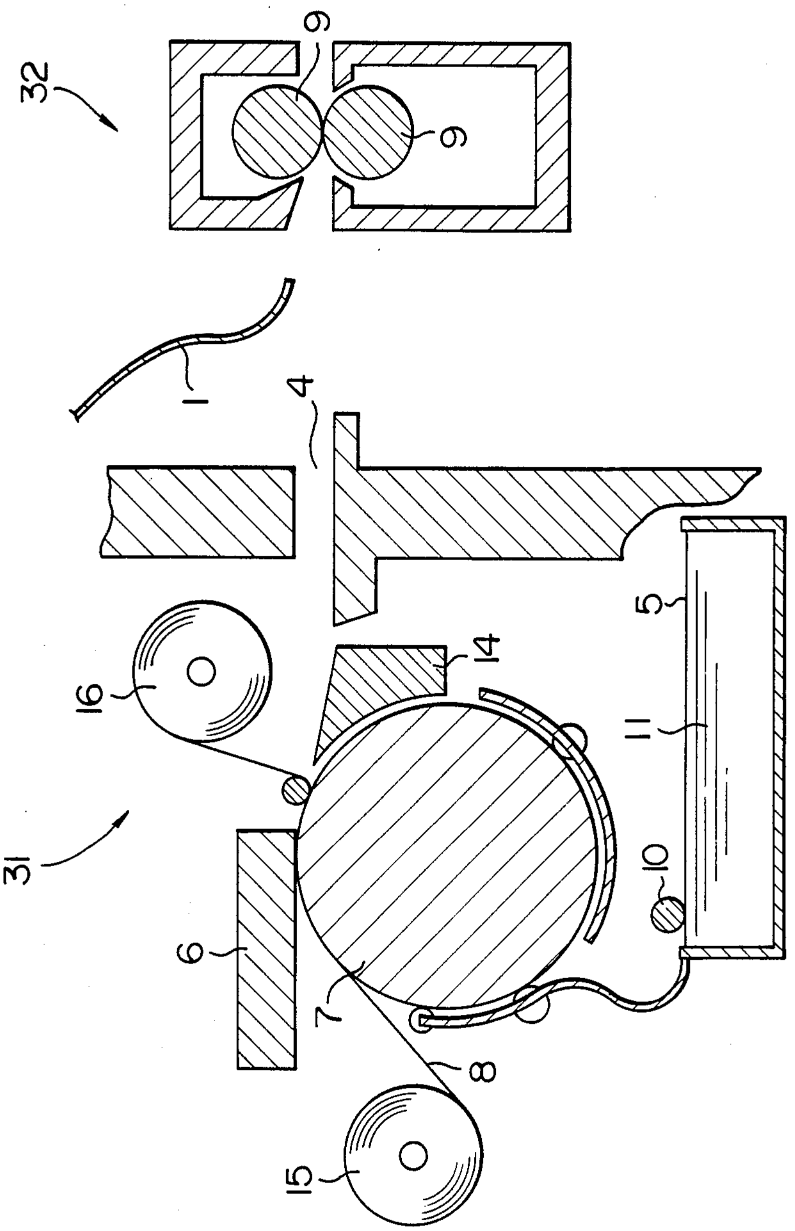
FIG. 7 is a schematic cross-sectional view of a thermal-transfer recording apparatus of a third embodiment of the present invention.

FIG. 7 shows a schematic cross-sectional view of a thermal-transfer recording apparatus of a third embodiment of the present invention.

In FIG. 7, the same components as those shown in FIG. 2 are indicated by the same reference numerals.

In the thermal-transfer recording apparatus of this embodiment, the intermediate recording sheet processing device 31 and the bonding device 32 are respectively accommodated in separate boxes.

The operation of the thermal-transfer recording apparatus thus constructed will be described below. The intermediate recording sheet processing device first records a mirror image of a desired image onto an intermediate recording sheet 5 in the same manner as in the case of the embodiment shown in FIG. 1. After this recording, the intermediate recording sheet 5 is discharged from the discharge opening 4 to the outside. A desired recording medium 1 and the recording surface of the intermediate recording sheet 5 on which the mirror image of the desired image has been recorded are thereafter superposed one on the other by an external means (e.g., manual operation) and are projected into the bonding device 32. The recording medium 1 and the intermediate recording sheet 5 projected are thereafter heated so that the ink absorbing adhesive layer of the intermediate recording sheet 5 is softened and is bonded to the recording medium 1, thereby completing recording in the same manner as in the embodiments shown in FIGS. 1 to 6.

This embodiment has advantages such as those described below, in addition to the advantages of the embodiment shown in FIG. 1.

The intermediate recording, namely, thermal transfer and the bonding process can be effected parallel at the same time, thereby further improving the efficiency of recording operation.

The intermediate recording sheet 5 on which the mirror image has been recorded can be bonded to not only paper but also a sheet of recording medium having a desired shape, size and rigidity, thereby further improving the applicability of the thermal-transfer recording apparatus.

As described above, the thermal-transfer recording apparatus in accordance with the present invention ensures that a stable image can be recorded on a desired recording medium.

Then, a printing control circuit used in the control unit of the invention will be explained with reference to FIG. 8.

Figure 8:
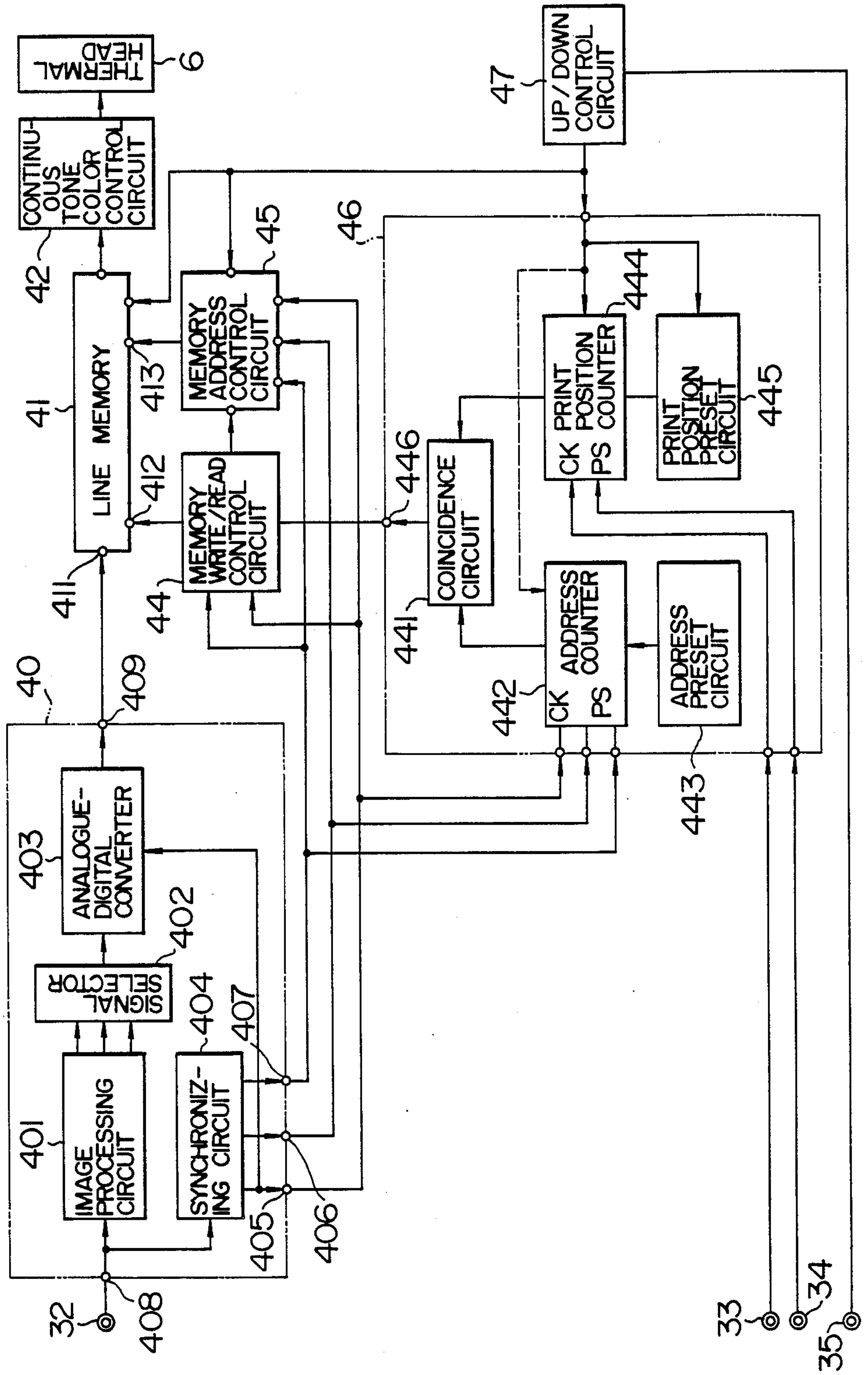
FIG. 8 is a circuit diagram of a printing control circuit used in the control unit of the invention.

A printing control circuit shown in FIG. 8 includes a stationary image processing circuit 40, a line memory 41, a continuous tone color control circuit 42, the thermal head 6, a memory write/read control circuit 44, a memory address control circuit 45, a print line control circuit 46 and a up/down control circuit 47. To the stationary image processing circuit 40, image signals are supplied through an image input terminal 32. To terminals 33, 34, 35, control signals are supplied from a system not shown controller. The stationary image processing circuit 40 comprises an image pprocessing circuit 401, a signal selector 402, analogue-digital converter 403 (hereinafter, referred as ADC) and a synchronizing circuit 404. The print line control circuit 46 comprises a coincidence circuit 441, an address counter 442, an address preset circuit 443, a print position counter 444 and a print position preset circuit 445.

An image signal input to an image signal input terminal 32 is demodulated to the three primary color signals (red, green and blue) by the image processing circuit 401 and then only a primary color signal to be printed is selected by the signal selector 402 in the stationary image processing circuit 40. The selected signal is converted to a digital signal by the ADC 403 and is recorded in the line memory 41.

The other hand, the image signal is input to the synchronizing circuit 404 at the same time and in the synchronizing circuit 404, a vertical synchronizing signal VD, horizontal synchronizing signal HD and a system clock SCK are separated and generated.

Write/read control to the line memory 41 is effected by the memory write/read control circuit 44 and the memory address control circuit 45. First, image data for one line are written into the line memory 41 and thereafter the data are read out from the line memory 41 to be fed to the control circuit for the depth of color 42. In the continuous tone color control circuit 42, the data fed from the line memory 41 are converted into on-off signals which move the thermal head 6 and the on-off signals are fed to the thermal head 6.

The memory write/read control circuit 44 determines the timing of writing to the line memory 41 on the basis of the vertical synchronizing signal VD and the horizontal synchronizing signal HD from the synchronizing circuit 404. Concretely, the vertical synchronizing signal VD, the horizontal synchronizing signal HD and the system clock SCK separated by the synchronizing circuit 404 are input to the address counter 442 and a preset value from the address preset circuit 443 is preset to the address counter 442 by means of the horizontal signal HD and the system clock SCK is counted as a clock. The other hand, to the print position counter 444, a one-line start signal which is input to a terminal 33 per one printing line is input to a clock input terminal and a one-color start signal which is input to a terminal per primary color is supplied to a preset input terminal. The count values output from the address counter 442 and the print position counter 444 are input to the coincidence circuit 441. When the count values coincide with each other, a coincidence output is input to the memory write/read control circuit 44 through a terminal 446. In the memory write/read control circuit 44, the data supplied from the ADC 403 are written into the line memory 41 in synchronized with the timing of the coincidence signal. Further, in the memory address control circuit 45, writing addresses are generated on the basis of the vertical synchronizing signal VD, the horizontal synchronizing signal HD and the system clock SCK from the synchronizing circuit 404 by means of the same timing and are output to an address signal input terminal 413. As a result, whenever one line is printed, the count value is increased or decreased one by one by the print position counter 444. Thereby, the position on which the coincidence circuit 441 detects the coincidence is also shifted for one clock in the horizontal direction. As explained above, whenever one line is printed, the timing of the image signal written into the line memory 41 is scanned one clock at a time in the horizontal direction, so that a stationary image is printed.

The print position counter 444 determines the leading position of the printing by means of the print position preset circuit 445. When a print signal is input to the print signal input terminal 35 from the system controller, the up/down control circuit 47 supplies a print reverse signal to the print position counter 444. Then, the print position counter 444 is changed to a down-count mode from the up-count mode. Thereby, whenever one line is printed, the count value is reduced one by one. As a result, the coincidence output is scanned from the right to the left in relation to the image as the image is printed, so that the printed image is reversed in the left and right direction in relation to the image. The print position preset circuit 445 is preset at the left side of the image upon normal printing and is preset on the right side of the image upon the reverse printing.

In the embodiment, it is employed to change the up and down count mode of the print position counter 444. It, however, is not limited to this procedure. As shown by a dotted line in FIG. 8, it may be employed to change the up- and down- count mode of the address counter 442 on the basis of the output of the up/down control circuit 47. In such a case, it is also possible to output the signal commanding to scan from the right to the left in relation to the image at the output terminal of the coincidence circuit 441. Moreover, it is also possible to obtain the reversed image print by generating addresses upon reading out which are reversed in relation to the addresses used upon writing by means of the memory address control circuit 45 and supplying the addresses for the line memory 41. That is to say, if addresses 1, 2, 3, ...N are generated upon writing, addresses N, N-1, N-2, ...2, 1 are generated upon reading and supplied to the line memory 41, so that it is possible to obtain an image print which is reversed in vertical direction in relation to the actual image.

What is claimed is:

1. A thermal-transfer recording apparatus comprising:

an intermediate recording sheet processing device and a bonding device;

said intermediate recording sheet processing device having:

an ink tape to which at least one color ink has been applied;

intermediate recording sheets each having a base film and an ink absorbing adhesive layer formed on said base film;

a guide drum rotatably disposed on a side of a surface of said ink tape to which said color ink has been applied;

a cassette containing said intermediate recording sheets disposed in the vicinity of said guide drum;

supply means for supplying said intermediate recording sheets from said cassette onto said guide durm, said supply means including a supply roller, guide rollers and a guide plate disposed around said guide drum;

a thermal head having a plurality of heating points disposed so as to face a surface of said ink tape which is opposite to the ink applied surface, said thermal head being adapted for transferring a mirror image of a desired image to an obverse surface of said ink absorbing adhesive layer of said intermediate recording sheet on said guide drum by selectively heating said ink tape;

an ink tape supply device for extending said ink tape between the thermal head and said intermediate recording sheet on said guide drum, said ink tape supply device including an ink tape supply reel and an ink tape winding reel;

a discharge member for separating said intermediate recording sheet on said guide drum to which a mirror image has been transferred from said guide drum, said discharge member being pivotally disposed in the vicinity of the guide drum;

a control unit for converting an image signal into a mirror image signal, selectively making said plurality of heating points of said thermal head generate heat on the basis of said mirror image signal and controlling the amount of heat generated at said heating points, and said control unit further controlling an operation of said intermediate recording sheet supply means to supply the intermediate recording sheets onto said guide drum, an operation of said ink tape supply device to supply the ink tape between the thermal head and guide drum and an operation of the discharge member to separate the intermediate recording sheet from said guide drum; and said bonding device having a desired recording medium and a bonding means for bonding said intermediate recording sheet to which said mirror image has been transferred to said recording medium at the obverse surface of said ink absorbing adhesive layer.

2. A thermal-transfer recording apparatus according to claim 1, wherein said bonding device is accommodated in a box separate from said intermediate recording sheet processing device.

3. A thermal-transfer recording apparatus according to claim 1, wherein said bonding device and said intermediate sheet processing device are accommodated in one box.

4. A thermal-transfer recording apparatus according to claim 1, wherein said control unit has: an image input section which reads a desired image by breaking down said image into digital image signals at a plurality of points; a memory section which stores said plurality of digital image signals read by said image input section; main-scanning-direction and sub-scanning-direction memory address control sections for controlling the operation of storing said plurality of image signals in said image memory section at predetermined addresses; a read-out reversal switch for setting the order of sub-scanning-direction addresses to be the reverse of the order used on writing when each of said digital signals stored in said image memory section is read out; a print control section which reads out said digital image signals stored in said image memory section and which selectively causes a plurality of heating points of said thermal head to generate heat on the basis of said digital image signals read out and controlling the amount of heat at said points 5. A thermal-transfer recording apparatus according to claim 1, wherein said bonding device is a pair of rollers having a nip through which said intermediate recording sheet to which said mirror image has been transferred and said recording medium are transported while being superposed each other.

6. A thermal-transfer recording apparatus according to claim 1, wherein said base film of said intermediate recording sheet is formed of a transparent member.

7. A thermal-transfer recording apparatus according to claim 1, wherein said ink absorbing layer of the intermediate recording medium has a softening temperature lower than that of said base film.

8. A thermal-transfer recording apparatus according to claim 1, further comprising:

an image signal input terminal into which the image signal is input, a line memory of which input thermal is connected to said image signal input terminal and output terminal is connected to said thermal head, a print signal input terminal into which a print signal for changing the normal image over to a reversed image is input, memory control means for controlling the reading and writing of data at said line memory in response to the print signal, said memory control means comprising:

memory write/read control means for shifting the data writing into said line memory and the date reading from said line memory, memory address generating means for generating writing addresses and reading addresses to said line memory, an address counter for counting clock signals synchronized with the image signal input to said image signal input terminal, a print position counter for counting line numbers printed, coincidence detecting means for comparing an output of said address counter and an output of said print position counter and for supplying a write/read timing signal to said memory write/-read control means on the basis of a comparison result, and up/down control means for supplying a print reverse signal to said memory control means in response to the print signal from said print signal input terminal.

9. A thermal-transfer recording apparatus according to claim 8, wherein said print reverse signal is supplied to said address counter and said address counter changes the counting direction thereof in response to said print reverse signal.

10. A thermal-transfer recording apparatus according to claim 8, wherein said print reverse signal is supplied to said print position counter and said print position counter changes the counting direction thereof in response to said print reverse signal.

11. A thermal-transfer recording apparatus according to claim 8, wherein said print reverse signal is supplied to said memory address generating means and in response to said print reverse signal, said memory address generating means supplies reading addresses to said line memory when reading out the data from said line memory, said reading addresses being reversed in relation to the writing addresses used upon writing the data into said line memory.

* * * * *